United States Patent
Lee et al.

(10) Patent No.: US 7,907,173 B2
(45) Date of Patent: Mar. 15, 2011

(54) APPARATUS AND METHOD FOR CONTROLLING NOISE CAUSED BY VIBRATION IN CAMERA MODULE FOR MOBILE DEVICE

(75) Inventors: Yeon-Jun Lee, Suwon-si (KR); Young-Kwon Yoon, Seoul (KR); Yong-Hwan Choi, Suwon-si (KR); Sung-Wook Kang, Seoul (KR); Dong-Youl Park, Suwon-si (KR); Woon-Tahk Sung, Seoul (KR); Jun-Young Lee, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 289 days.

(21) Appl. No.: 12/176,511

(22) Filed: Jul. 21, 2008

(65) Prior Publication Data
US 2009/0021610 A1    Jan. 22, 2009

(30) Foreign Application Priority Data
Jul. 20, 2007    (KR) .................. 10-2007-0072788

(51) Int. Cl.
*H04N 5/228*    (2006.01)
*H04N 5/225*    (2006.01)

(52) U.S. Cl. .............. 348/208.11; 348/340; 348/374
(58) Field of Classification Search .............. 348/208.2, 348/208.4, 208.7, 208.11, 208.12, 340, 374
See application file for complete search history.

(56) References Cited

U.S. PATENT DOCUMENTS

| | | | |
|---|---|---|---|
| 7,202,905 B2 * | 4/2007 | Castaneda et al. ........... 348/373 |
| 7,663,824 B2 * | 2/2010 | Lee ............................. 359/824 |
| 7,778,535 B2 * | 8/2010 | Kobayashi .................... 396/55 |
| 2007/0212046 A1 * | 9/2007 | Sogoh et al. .................. 396/55 |
| 2010/0183287 A1 * | 7/2010 | Yagi ............................. 396/52 |

FOREIGN PATENT DOCUMENTS

JP    2005283894 A    * 10/2005
JP    2006173886 A    *  6/2006

* cited by examiner

*Primary Examiner* — John M Villecco
(74) *Attorney, Agent, or Firm* — Cha & Reiter, LLC

(57) ABSTRACT

An apparatus and method for controlling noise caused by vibration in a camera module for a mobile device are provided. The method includes transmitting a vibration signal sensed by a vibration sensor to a Choice Coil Motor (VCM) driver based on the vibration signal, applying, by the VCM driver, a reverse bias to a VCM upon receiving, by the VCM driver, the vibration signal from the vibration sensor, and exerting, by the VCM to which the reverse bias is applied, an electromagnetic force in a reverse direction in order to fix and halt an actuator.

10 Claims, 4 Drawing Sheets

APPARATUS AND METHOD FOR CONTROLLING NOISE CAUSED BY VIBRATION IN CAMERA MODULE FOR MOBILE DEVICE

CLAIM OF PRIORITY

This application claims the benefit of an earlier Korean Patent Application filed in the Korean Intellectual Property Office on Jul. 20, 2007 and assigned Serial No. 2007-72788, the entire disclosure of which is hereby incorporated by reference.

BACKGROUND OF THE INVENTION

1. Field of the Invention

The present invention relates to a camera module, and in particular, to an apparatus and method for controlling noise caused by vibration in a camera module for a mobile device.

2. Description of the Related Art

With the popularization of digital mobile devices, the roles of the digital mobile devices have changed. In particular, recent digital mobile devices serve more important roles as a personal portable communication device, and as an information processor like a personal information management device. Various additional functions satisfying such roles have been suggested for mobile devices, and the suggested functions have been implemented generally by allowing input of necessary information through a mobile device.

A camera module mounted in a mobile has been regarded as an essential element for inputting necessary image information in a portable digital camera. A camera module generally used in a mobile device moves a tens by driving a mounted Voice Coil Motor (VCM) in order to auto-focus an image.

FIG. 1 illustrates an example of a typical camera module using a VCM module"), in which a side cross-sectional view of the VCM camera module is shown. The VCM camera module consists of a spring, a permanent magnet, a coil, a carrier, etc. The VCM camera module operates to perform auto-focusing in a manner that a position of the carrier is changed by applying an electric current to the coil of the VCM.

Referring to FIG. 1, the VCM camera module includes a lens housing 109 in the shape of a cylinder extending longitudinally, a tens barrel 103 inside the lens housing 109, in which one or more focusing lenses 101 are mounted in the direction of an optical axis, and a coil 105 positioned along an outer circumference of the lens barrel 103 in the direction of the optical axis. Positioned on the outer circumference of the lens barrel 103 is a yoke having mounted therein a permanent magnet 111 facing the coil 105 to form a magnetic field. Positioned above the lens barrel 103 is a leaf spring 113 for providing an elastic force to allow a up/down rectilinear movement of the lens barrel 103 in the direction of the optical axis.

The VCM camera module structured as described above operates as follows. When an electric current in a particular direction is applied to the coil 105, a drive force is generated by an electromagnetic force generated between the coil 105 and the permanent magnet 111 facing the coil 105. According to the Fleming's Left Hand Rule, a force urging the lens barrel 103 to rectilinearly move up and down in the direction of the optical axis is generated by the applied electric current. The generated force is proportional to the intensity of the applied electric current. By adjusting the intensity of the applied electric current, the position of the lens barrel 103 and the focus of the lens 101 are adjusted. In other words, a magnetic field is formed when an electric current flows through the coil 105, and the generated magnetic field is moved by its repulsive force against the permanent magnet 111. The leaf spring 113 serves to determine the position of the moving section by applying its restoring force, and when no current flows, the leaf spring 113 fixes the lens 101 so that it is forced toward the sensor.

In this state, the lens housing 109 is positioned on the sensor unit 115. The sensor unit 115 includes a Printed Circuit Board (PCB) 115a, an image sensor 115b, as an imaging device, attached onto the PCB 115a, and an InfraRed (IR) filter 115c on the image sensor 115b. A Flexible PCB (FPCB) 117 is electrically connected with a bottom of the PCB 115a.

Recently, touch-sensitive screens have often been attached onto mobile devices such as hand-held phones, Personal Digital Assistants (PDAs), palm-sized personal computers, etc. The touch-sensitive screens are intended to promote convenience by allowing users to easily input desired information as in the conventional keyboards. Functions of a mobile device having mounted thereon a touch-sensitive screen include allowing a user to recognize a touch by sensing the moment of the touch and delivering the sensing result to a vibrating motor by a sensor to drive the vibrating motor.

Vibration of the vibrating motor is delivered to the VCM camera module through a body of the mobile device. Typically, the mobile device is designed such that vibration generated by a touch pad can be controlled when the VCM camera module operates to perform imaging in the mobile device.

However, if vibration occurs while the VCM camera module is in a stop position, because of fixation using a spring in the VCM camera module, vibration generated by the vibrating motor shakes the VCM camera module, causing the VCM camera module to be run against peripheral structures. Since the VCM camera module cannot but be shaken, vibration generated by the vibrating motor causes noise.

SUMMARY OF THE INVENTION

An aspect of the present invention is to address at least the above problems and/or disadvantages and to provide at least the advantages described below. Accordingly, an aspect of the present invention is to provide an apparatus and method for controlling noise caused by vibration generated from a vibrating motor in a camera module for a mobile device.

According to an aspect of the present invention, a method for controlling noise caused by vibration in a camera module for a mobile device includes: transmitting a vibration signal sensed by a vibration sensor to a Voice Coil Motor (VCM) driver based on the vibration signal, applying, by the VCM driver, a reverse bias to a VCM upon receiving the vibration signal from the vibration sensor, and exerting, by the VCM to which the reverse bias is applied, an electromagnetic force in a reverse direction in order to fix and halt an actuator.

According to another aspect of the present invention, an apparatus for controlling noise caused by vibration in a camera module for a mobile device includes: level converter for receiving a Pulse Width Modulation (PWM) signal and converting the PWM signal into a Direct Current (DC) signal to control the driving of a Voice Coil Motor (VCM) driver, at least one switching units for forming different current paths according to the execution/non-execution of imaging using a VCM, a constant-current source circuit for supplying a constant electric current to fix an actuator when the VCM driver applies a reverse bias to the VCM, and a vibration sensor for sensing if vibration is generated outside the camera module and applying a sensed vibration signal to the VCM driver.

The vibration sensor may include a Piezo sensor for sensing vibration and generating the vibration signal, a Band Pass Filter (BPF) for extracting only the vibration signal caused by the vibrating motor, an amplifier for amplifying the extracted vibration signal, an envelope detector for envelope-detecting the amplified vibration signal, a Low Pass Filter (LPF) for removing noise of the vibration signal and keeping an output voltage constant, and a comparator for comparing the vibration signal with a reference voltage and applying the vibration signal to the VCM vibrator if the sensed vibration signal is the vibration signal caused by the vibrating motor.

BRIEF DESCRIPTION OF THE DRAWINGS

The above and other features and advantages of an exemplary embodiment of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. For the purposes of clarity and simplicity, descriptions of well-known functions and constructions are omitted for clarity and conciseness. Terms used herein are defined based on functions in the present invention and may vary according to users, operators' intention or usual practices. Therefore, the definition of the terms should be made based on contents throughout the specification.

Since a camera module using a Voice Coil Motor (VCM), or a VCM camera module, typically uses a spring for its structure separated into an electromagnet and a coil, it is entirely exposed to external mechanical vibration, failing to control shock caused by the vibration. In other words, vibration generated by a vibrating motor shakes the VCM camera module, thereby generating undesirable noise within the camera module.

Hereinafter, the present invention will suggest a new system for controlling noise caused by vibration generated outside the VCM camera module by applying a reserve bias to a coil of the VCM to fix and halt an actuator towards a sensor of the VCM camera module with a force generated by a reverse rotation of the VCM when the mechanical vibration is generated from a vibrating motor. This action fixes and halts the actuator inside the VCM camera module, thereby controlling noise caused by a vibrating motor in a conventional mobile device.

Figure 1:
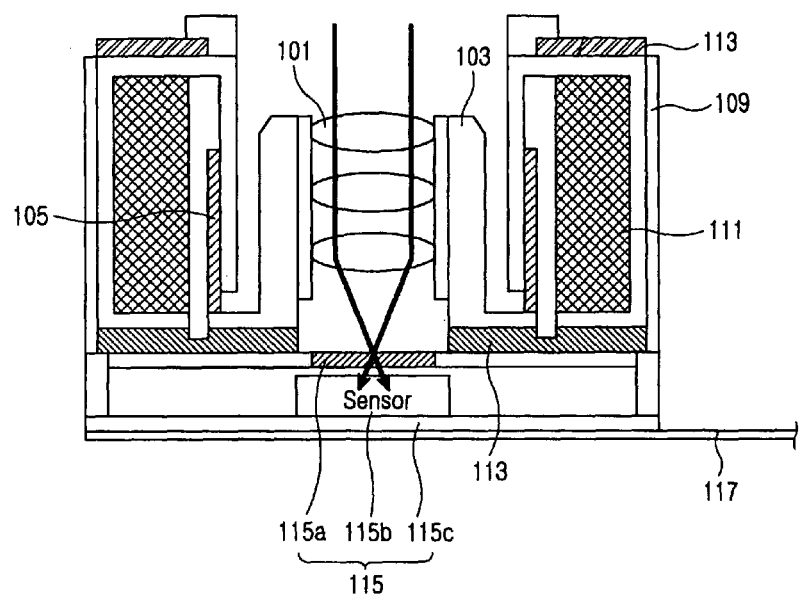
FIG. 1 illustrates an example of a conventional camera module using a Voice Coil Motor (VCM)
Figure 2:
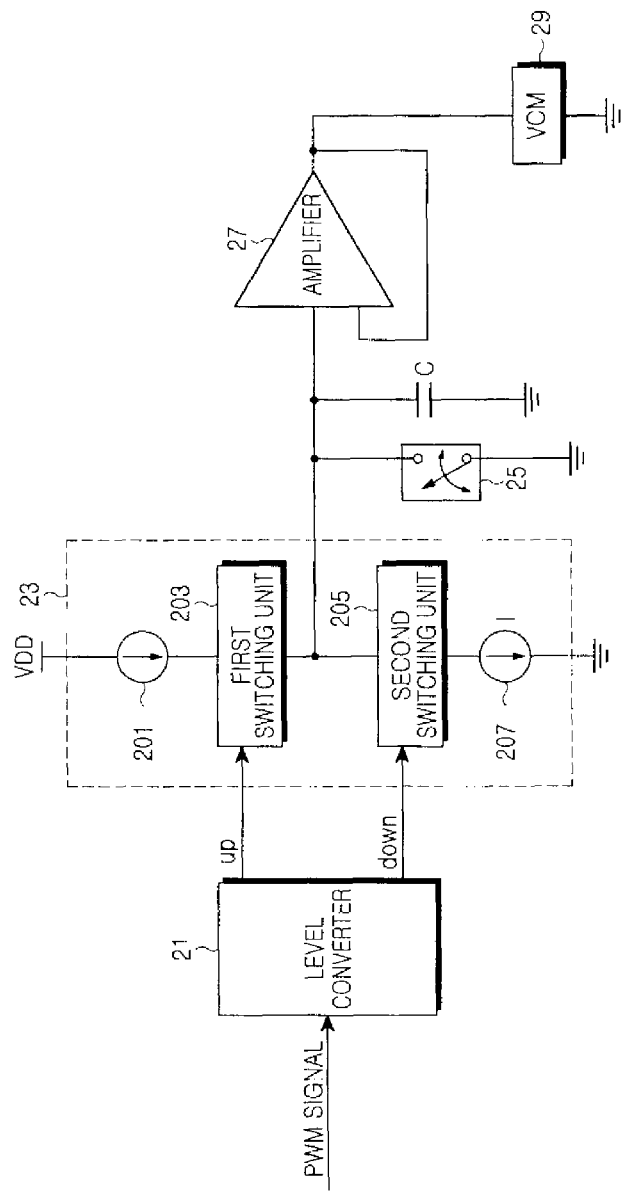
FIG. 2 is a block diagram illustrating a structure of a VCM driver to which the present invention is applied.

FIG. 2 is a block diagram illustrating a structure of a VCM driver to which the present invention is applied.

Referring to FIG. 2, the VCM driver to which the present invention is applied includes a capacitor C, a level converter 21, a charge pump 23, and an amplifier 27. The level converter 21 converts a Pulse Width Modulation (PWM) signal into a constant current signal suitable for a voltage value used in the charge pump 23.

The charge pump 23 is structured such that a first current source 201, a second switching unit 203, a second switching unit 204, and a second current source 207 are connected in series. Switches of the first switching unit 203 and the second switching unit 205 are set to be short-circuited only when a signal is input thereto.

The first switching unit 203 short-circuits or opens a switch according to the PWM signal being level-converted by the level converter 21. The first current source 201 located between the first switching unit 203 and a power source VCC controls an electric current to flow through the first switching unit 203 at a predetermined magnitude.

The second switching unit 205 is serially connected with the first switching unit 203, and short-circuits or opens its switch according to the PWM signal being level-converted by the level converter 21 like the first switching unit 203. Similar to the first current source 201, the second current source 207 positioned between the second switching unit 205 and a ground GND controls an electric current to flow through the second switching unit 205 at a predetermined magnitude.

The VCM driver structured as described above operates as follows. First, the PWM signal is converted into the constant current signal by passing through the level converter 21. If the constant current signal has a high value, i.e., the constant current signal is an "Up" signal, it is transmitted to the first switching unit 203 to short-circuit the switch of the first switching unit 203, while the switch of the second switching unit 205 is opened because no signal is transmitted thereto. An electric current, supplied by the first current source 201 through the short-circuited switch of the first switching unit 203, is delivered to the capacitor C to charge the capacitor C, thus raising a voltage at an output terminal of the charge pump 23. For smooth current supply to a VCM 29, the electric current is delivered to the VCM 29 after being amplified by the amplifier 27.

On the other hand, if the constant current signal acquired by the level converter 21 has a low value, i.e., the constant current signal is a "Down" signal, it is transmitted to the second switching unit 205 to short-circuit the switch of the second switching unit 205, while the first switching unit 203 is opened because no signal is transmitted thereto. The "Down" signal transmitted to the second switching unit 205 flows to the ground GND through the second current source 207. Since the switch of the first switching unit 203 is opened, an electric current, supplied by the first current source 201, is blocked by the first switching unit 203, thus discharging electric charges accumulated in the capacitor C and lowering the voltage at the output terminal of the charge pump 23.

At an initial operation stage of the VCM driver, unwanted initial electric charges may be accumulated in the capacitor C. Thus, as illustrated in FIG. 2, a discharging switch 25 is additionally included between the output terminal of the charge pump 23 and the ground GND. The electric charges accumulated in the capacitor C can be discharged by short-circuiting the discharging switch 25, thereby adjusting an initial value of the capacitor C to "0". For smooth supply of an electric current for driving the VCM 29, the amplifier 27 is installed to supply the electric current to the VCM 29.

Figure 3:
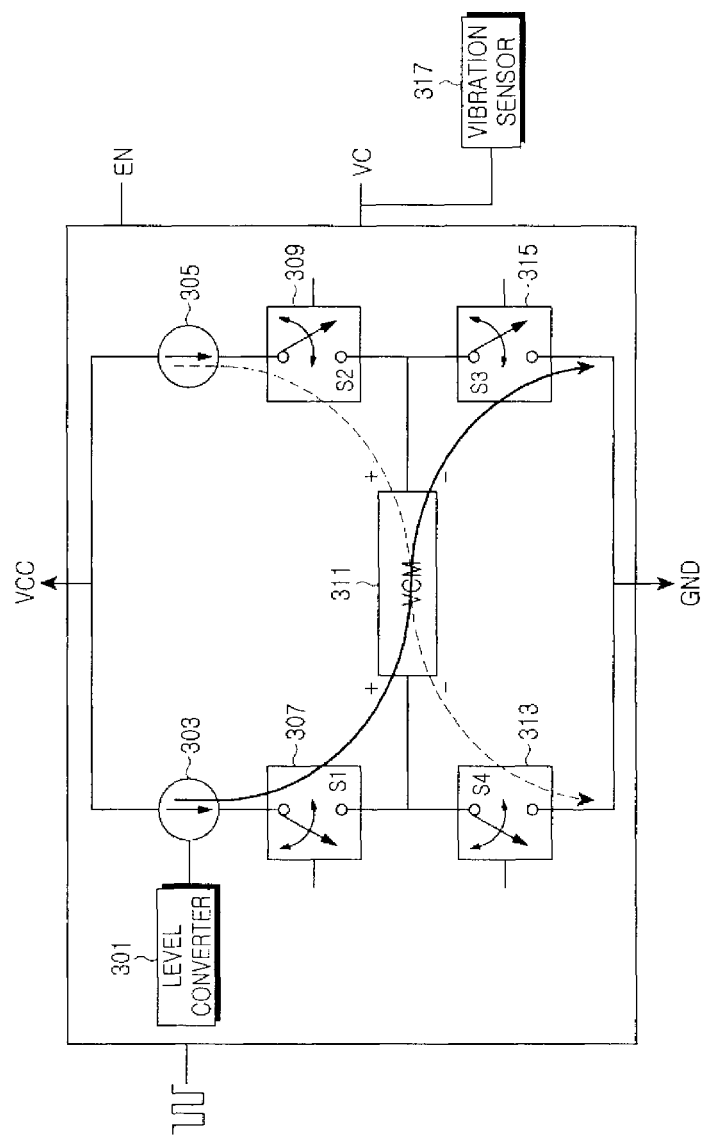
FIG. 3 is a schematic block diagram illustrating a structure of a VCM driver according to an embodiment of the present invention.

In an alternate embodiment, the VCM driver illustrated in FIG. 2 can be modified suitably for the present invention as illustrated in FIG. 3.

FIG. 3 is a schematic block diagram illustrating a structure of a VCM driver according to an exemplary embodiment of the present invention, in which the VCM driver controls vibration of a VCM camera module, which is generated from a vibrating motor of the VCM camera module, by applying a reserve bias. A VCM can be driven by a constant-voltage driving scheme and a constant-current driving scheme. The constant-current driving scheme using an Integrated Circuit (IC) may be used in the present invention.

Referring to FIG. 3, a first current source 303 connected with a level converter 301, a first switching unit 307, and a fourth switching unit 313 are connected in series, and a second current source 305, a second switching unit 309, and a third switching unit 315 are connected in series. A VCM 311 is configured in the form of a bridge circuit in which both terminals of the VCM 311 are connected between the first switching unit 307 and the fourth switching unit 313 and between the second switching unit 309 and the third switching unit 315, respectively. A switch of each switching unit is set to be short-circuited only when a signal is input thereto.

The level converter 301 receives the PWM signal for controlling driving of the VCM 311 and converts the PWM signal into a constant-current signal, and a vibration sensor 317 senses if vibration is generated from a vibrating motor and delivers generation/non-generation of vibration to the VCM driver. The second current source 305 applies a reverse bias against the vibration generated by the vibrating motor to the VCM driver in order to supply a constant electric current for halting the VCM camera module, and each switching unit short-circuits or opens its switch according to an input signal to form a path of the electric current.

The VCM driver structured as described above operates as follows.

If a "High" signal indicating driving of the VCM camera module is applied to an enable terminal EN, a current path of the applied signal is formed such that the current of the applied signal flows from the power source VCC to the first switching unit 307, then to the third switching unit 315 via the VCM 311, and then to the ground GND. This current path is indicated by a solid line in FIG. 3. The first current source 303 allows an electric current of a predetermined magnitude to flow through the first switching unit 307 and the third switching unit 315. At this time, the switches of the second switching unit 309 and the fourth switching unit 313 are opened, thus the electric current does not flow therethrough.

If the PWM signal is input to the VCM driver in a state where the "High" signal is applied to the enable terminal EN, the PWM signal is converted into a constant electric current having a Direct Current (DC) component by the level converter 301 and the switches of the first switching unit 307 and the fourth switching unit 313 are short-circuited. The constant electric current flows along the solid line shown in FIG. 3 through the short-circuited first switching unit 307 and the short-circuited fourth switching unit 313, whereby the VCM 311 is driven, thus a camera module's original function, i.e., imaging is executed.

On the other hand, if a "Low" signal is applied to the enable terminal EN, driving of the VCM camera module is stopped and the switches of the first switching unit 307 and the third switching unit 315 are opened, thus the electric current does not flow therethrough.

In this case, a subsequent operation is determined according to generation/non-generation of vibration caused by the vibrating motor. In the case of generation of vibration, the vibration sensor 317 senses if vibration is generated from the vibrating motor.

If the vibration sensor 317 senses a certain signal and the sensed signal is a vibration signal caused by the vibrating motor, the vibration sensor 317 inputs a "High" signal to a terminal VC of the VCM vibrator. The VCM vibrator to which the "High" signal is input short-circuits the second switching unit 309 and the fourth switching unit 313 to form a current path along a dotted line shown in FIG. 3. The current path indicated by the dotted line is formed such that the current flows to the second switching unit 309 from the power source VCC, then to the fourth switching unit 313 via the VCM 311, and then to the ground GND. Once the constant electric current flows along the formed current path, a reverse bias is applied to the VCM 311.

The VCM 311 to which the reverse bias is applied rotates reversely, and an actuator of the VCM camera module applies a force towards the sensor of the VCM camera module in opposite to a force directed forward for imaging in an imaging mode. The force applied towards the sensor is exerted on the actuator fixed towards the sensor of the VCM camera module when the electric current does not flow, thereby controlling noise caused by vibration in the VCM camera module.

On the other hand, if the signal sensed by the vibration sensor 317 is not the vibration signal associated with vibration generated by the vibrating motor, the vibration sensor 317 inputs a "Low" signal to the terminal VC. In this case, the second switching unit 309 and the fourth switching unit 313 remain opened as in their initial states, and the electric current does not flow to the VCM driver.

Figure 4:
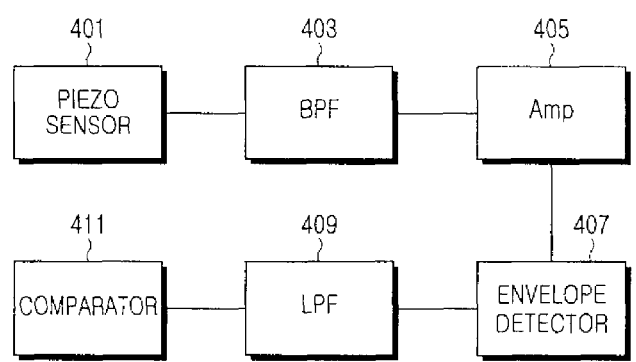
FIG. 4 is a block diagram illustrating an internal structure of a vibration sensor for sensing if vibration is generated from a vibrating motor and sending a vibration signal to a VCM driver according to an embodiment of the present invention.

FIG. 4 is a block diagram illustrating an internal structure of a vibration sensor for sensing if vibration is generated from a vibrating motor and sending a vibration signal to a VCM driver according to an exemplary embodiment of the present invention.

Referring to FIG. 4, if a certain signal associated with vibration is sensed by a Piezo sensor 401, it passes through a Band Pass Filter (BPF) 403 for determination of whether it is the vibration signal caused by the vibrating motor, whereby only the vibration signal is extracted. The extracted vibration signal is amplified by an amplifier (Amp) 405 and the amplified vibration signal is envelope-detected by an envelope detector 407. The amplified vibration signal is converted into a DC signal by passing through a Low Pass Filter (LPF) 409, and the DC signal is transmitted to a comparator 411. The comparator 411 compares the DC signal with a reference voltage to apply the "High" signal or the "Low" signal to the terminal VC of the VCM driver. The Piezo sensor 410 may be replaced with a Gyro sensor or an acceleration sensor.

Since the vibration sensor described above serves as a kind of controller which transmits the vibration signal for determining application/non-application of the reverse bias to the terminal VC, it is separately positioned outside the VCM driver structured according to the teachings of the present invention as illustrated in FIG. 3 and its position may be beside the camera module inside the mobile device, or beside a vibrator in order to sense shaking caused by vibration generated by the vibrating motor.

As is apparent from the foregoing description, the present invention can control noise caused by vibration generated from a vibrating motor when a touch pad is pressed in a VCM camera module for a mobile device.

While the apparatus and method for controlling noise caused by vibration in a camera module for a mobile device according to the invention has been shown and described with reference to a certain preferred embodiment thereof it will be understood by those skilled in the art that various changes in form and details may be made therein without departing from the spirit and scope of the invention as defined by the appended claims.

What is claimed is:

1. A method for controlling noise caused by vibration in a camera module for a mobile device, the method comprising:
   transmitting a vibration signal sensed by a vibration sensor to a Voice Coil Motor (VCM) driver;
   applying, by the VCM driver, a reverse bias to a Voice Coil Motor (VCM) upon receiving the vibration signal from the vibration sensor; and
   exerting, by the VCM to which the reverse bias is applied, an electromagnetic force in a reverse direction in order to fix and halt an actuator.

2. The method of claim 1, wherein the camera module using the VCM is activated to sense the vibration signal when the camera module does not execute an imaging function.

3. The method of claim 1, wherein the applying of the reverse bias comprises applying the reverse bias to the VCM by transmitting a reverse electric current to a coil of the VCM via a constant-current source circuit.

4. The method of claim 1, wherein the exerting of the electromagnetic force comprises delivering a force to the actuator towards a sensor of the camera module by a rotation of the VCM when the VCM driver applies a reverse electric current to the VCM.

5. An apparatus for controlling noise caused by vibration in a camera module for a mobile device, comprising:
   a level converter for receiving a Pulse Width Modulation (PWM) signal and converting the PWM signal into a Direct Current (DC) signal to control a driving of a Voice Coil Motor (VCM) driver;
   at least one switching unit for forming different current paths according to execution/non-execution of imaging of the camera module using a Voice Coil Motor (VCM);
   a constant-current source circuit for supplying a constant electric current to fix an actuator when the VCM driver applies a reverse bias to the VCM; and
   a vibration sensor for sensing if vibration is generated outside the camera module and applying a sensed vibration signal to the VCM driver.

6. The apparatus of claim 5, wherein the vibration sensor comprises:
   a Piezo sensor for sensing vibration and generating the vibration signal;
   a Band Pass Filter (BPF) for extracting only the vibration signal caused by the vibrating motor;
   an amplifier for amplifying the extracted vibration signal;
   an envelope detector for envelope-detecting the amplified vibration signal;
   a Low Pass Filter (LPF) for removing noise of the vibration signal and keeping an output voltage constant; and
   a comparator for comparing the vibration signal with a reference voltage and applying the vibration signal to the VCM vibrator if the sensed vibration signal is the vibration signal caused by the vibrating motor.

7. The apparatus of claim 6, wherein the Piezo sensor is one of a Gyro sensor and an acceleration sensor.

8. The apparatus of claim 5, wherein the vibration sensor is positioned next to the camera module outside the VCM driver or next to a vibrator to sense if vibration is generated from the vibrating motor.

9. The apparatus of claim 5, wherein the VCM driver is configured in the form of a bridge circuit to form different constant-current paths according to execution/non-execution of imaging of the camera module using the VCM.

10. The apparatus of claim 5, wherein the at least one switching unit is configured to selectively short circuits or opens according to the PWM signal being level-converted by the level converter.

* * * * *